United States Patent
Kawai et al.

(10) Patent No.: US 7,047,915 B2
(45) Date of Patent: May 23, 2006

(54) ENGINE COOLING DEVICE

(75) Inventors: Yukio Kawai, Toyota (JP); Ryosuke Fujiki, Toyota (JP); Seiji Ohmura, Toyota (JP); Yoshikazu Shinpo, Toyota (JP)

(73) Assignee: Taiho Kogyo Co., Ltd., Aichi (JP)

( * ) Notice: Subject to any disclaimer, the term of this patent is extended or adjusted under 35 U.S.C. 154(b) by 0 days.

(21) Appl. No.: 10/526,246

(22) PCT Filed: Aug. 26, 2003

(86) PCT No.: PCT/JP03/10785

§ 371 (c)(1),
(2), (4) Date: Feb. 25, 2005

(87) PCT Pub. No.: WO2004/020799

PCT Pub. Date: Mar. 11, 2004

(65) Prior Publication Data
US 2005/0268868 A1 Dec. 8, 2005

(30) Foreign Application Priority Data
Aug. 30, 2002 (JP) .............................. 2002-256203

(51) Int. Cl.
*F02F 1/14* (2006.01)

(52) U.S. Cl. ................................... 123/41.79; 277/597
(58) Field of Classification Search ............. 123/41.72, 123/41.74, 41.79; 277/591, 597
See application file for complete search history.

(56) References Cited

U.S. PATENT DOCUMENTS
6,138,619 A   10/2000   Etemad ................... 123/41.74

FOREIGN PATENT DOCUMENTS
JP   2000-502768   3/2000
JP   2001-020738   1/2001

*Primary Examiner*—Noah Kamen
(74) *Attorney, Agent, or Firm*—Flynn, Thiel, Boutell & Tanis, P.C.

(57) ABSTRACT

In a cooling unit for an engine comprising a cylinder block 1 having a water jacket 4 which opens into the surface of the cylinder block 1 and which circulates a cooling water in surrounding relationship with a cylinder bore, and a gasket 11 held sandwiched between the cylinder head and the cylinder block 1 to seal therebetween, the gasket 11 is provided with a control board 21 which project into the water jacket 4 for controlling a flow of the cooling water, the control board 21 being formed to be arcuate in conformity to the profile of the water jacket 4 and disposed toward the intake port.

7 Claims, 5 Drawing Sheets

ENGINE COOLING DEVICE

TECHNICAL FIELD

The present invention relates to a cooling unit for an engine, and more particularly to a cooling unit for an engine which is provided with a water jacket opening into the surface of a cylinder head.

BACKGROUND ART

A cooling unit for an engine is known in the art which comprises a cylinder head formed with an intake port on one side and with an exhaust port on the other side, a water jacket formed in a cylinder block in surrounding relationship with a cylinder wall which defines cylinder bores and opening into the surface of the cylinder block, a gasket held sandwiched between the cylinder head and the cylinder block to seal therebetween, and a control board on the gasket and inserted into the water jacket.

An example of such a cooling unit for an engine is disclosed in Japanese Laid-Open Patent Application No. 502768/2000, which states that the control board controls a flow of cooling water within the water jacket to achieve an efficient cooling of an engine.

However, if the flow of cooling water within the water jacket is controlled in a manner as disclosed in the cooling unit for an engine of the citation, there still remain the following problem:

A first problem relates to a combustion chamber of an engine where it is recognized that the temperature is higher toward the exhaust port than toward the intake port, and the same is true toward the exhaust port in the cylinder wall.

Thus a temperature difference exists between the intake port and the exhaust port of the cylinder wall, and if the exhaust port is not sufficiently cooled, the cylinder wall toward the exhaust port may be deformed by thermal expansion, leading to an oil depletion caused by a deformation of the cylinder bore or a deformation of the surface of the cylinder block to induce a defective sealing by the gasket.

A second problem relates to a cooling water passage formed in the cylinder block to feed cooling water to the water jacket. Considering a cooling water temperature near the cylinder wall at a location which is adjacent to the inlet of the cooling water passage and at a location away from the inlet, the cooling water temperature is higher at the latter location, and this means that the cylinder wall located away from the inlet is insufficiently cooled in a corresponding manner, whereby the cylinder wall may be deformed by thermal expansion, presenting the problems of an oil depletion and a defective sealing of the gasket.

A third problem relates to a starting of an engine. When the warming up of the engine is not performed, the cylinder bores do not assume a raised temperature, and thus there is no need to cool it by cooling water. However, as the engine is started, the cooling water begins cooling the cylinder wall, and this flow of the cooling water prevents a temperature rise of the cylinder wall, requiring an increased length of time for the warming up of the engine.

It is common that a fuel cost during the warming up is degraded as compared with the fuel cost during a normal operation, and the longer it takes for the warming up, the worse the fuel cost.

With respect to above problems, a cooling unit for an engine according to a first invention which comprises a cylinder head formed with an intake port on one side and with an exhaust port on the other side, a water jacket formed in a cylinder block in surrounding relationship with a cylinder wall which defines cylinder bores and opening into the surface of the cylinder block, a gasket held sandwiched between the cylinder head and cylinder block to seal therebetween, and a control board on the gasket and inserted into the water jacket is characterized in that the control board is formed to be arcuate in conformity to the profile of the water jacket and is disposed only toward the intake port.

A cooling unit for an engine according to a second invention which comprises a cylinder head formed with an intake port on one side and with an exhaust port on the other side, a water jacket formed in a cylinder block in surrounding relationship with a cylinder wall which defines cylinder bores and opening into the surface of the cylinder block, a gasket held sandwiched between the cylinder head and cylinder block to seal therebetween, and a control board on the gasket and inserted into the water jacket is characterized in that the control board is formed to be arcuate in conformity to the profile of the water jacket and is disposed toward both the intake port and the exhaust port, a spacing between the control board and the cylinder wall toward the exhaust port being narrower than a spacing between the control wall and the cylinder wall toward the intake port.

A cooling unit for an engine according to a third invention which comprises a cylinder head formed with an intake port on one side and with an exhaust port on the other side, a water jacket formed in a cylinder block in surrounding relationship with a cylinder wall which defines cylinder bores and opening into the surface of the cylinder block, a gasket held sandwiched between the cylinder head and cylinder block to seal therebetween, and a control board on the gasket and inserted into the water jacket is characterized in that there are a plurality of cylinder bores and the control board is formed to be arcuate in conformity to the profile of the water jacket, the water board being provided toward both the intake port and the exhaust port for each cylinder bore, a spacing between the control board and the cylinder wall for the cylinder bore which is disposed adjacent to the inlet of a cooling water passage which feeds a cooling water to the water jacket being wider than a spacing between the control board and the cylinder wall for the cylinder bore which is disposed away from the inlet.

A cooling unit for an engine according to a fourth invention which comprises a cylinder head formed with an intake port on one side and with an exhaust port on the other side, a water jacket formed in a cylinder block in surrounding relationship with a cylinder wall which defines cylinder bores and opening into the surface of the cylinder block, a gasket held sandwiched between the cylinder head and cylinder block to seal therebetween, and a control board on the gasket and inserted into the water jacket is characterized in that there are a plurality of cylinder bores, and the control board is formed to be arcuate in conformity to the profile of the water jacket, the control board being disposed toward both the intake port and the exhaust port for each cylinder bore, the control boards disposed toward the intake port for each cylinder bore being connected together and the control boards disposed toward the exhaust port for each cylinder bore being connected together, there being a thermo-valve disposed between the control board disposed toward the intake port which is located adjacent to the inlet of a cooling water passage which feeds a cooling water to the water jacket and the control board disposed toward the exhaust port to open when the temperature of the cooling water has risen to a given value.

BRIEF DESCRPTIONS OF THE DRAWINGS

BEST MODES FOR CARRYING OUT THE INVENTION

Figure 1:
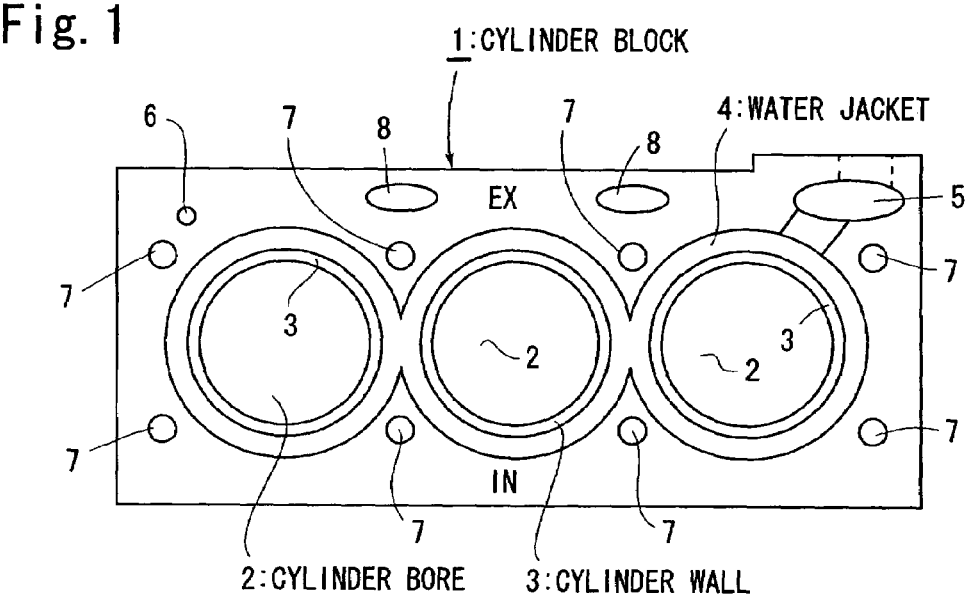
FIG. 1 is a plan view showing the surface of a cylinder block.

Embodiments shown in the drawings will now be described. FIG. 1 is a plan view of the surface of the cylinder block 1 of a three cylinder engine, as viewed from the side of a cylinder head, not shown.

The cylinder block 1 includes three cylinder walls 3, the interior of each of which defines a cylinder bore 2. A water jacket 4 is formed in surrounding relationship with each cylinder wall 3 in a manner to permit a communication therebetween. The water jacket 4 opens into the surface of the cylinder block 1, and is formed with a cooling water passage 5 which feeds a cooling water to the water jacket 4.

The cylinder block 1 is formed with an oil hole 6 which circulates a lubricant oil through the cylinder block 1, bolt holes 7 which are used when clamping the cylinder head and cylinder block 1 together, and blow-by holes 8 which pass a blow-by gas.

Figure 2:
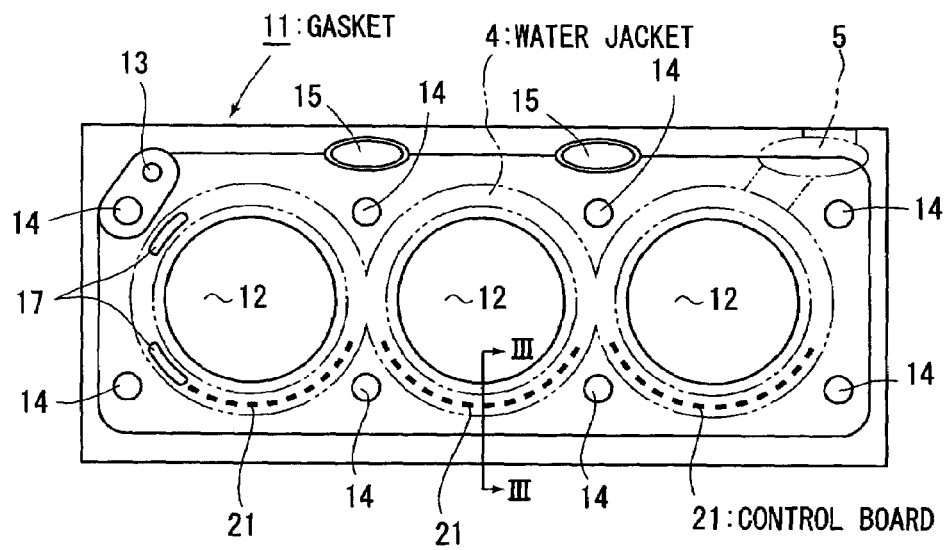
FIG. 2 is a plan view showing a gasket according to a first embodiment of the invention.

FIG. 2 shows a gasket 11 of the present embodiment which is held sandwiched between the cylinder head and the cylinder block 1 to seal therebetween. Double dot chain lines shown in FIG. 2 indicate the position of a cooling water passage 5 and the water jacket 4 in the cylinder block 1.

The gasket 11 is formed with combustion chamber openings 12, an oil hole 13, bolt holes 14 and blow-by holes 15 in alignment with the cylinder bores 2, the oil hole 6, the bolt holes 7 and the blow-by holes 8.

Water holes 16 are provided in overlying relationship with the water jacket 4 at a location adjacent to the combustion chamber opening 12 which is disposed most remote from the cooling water passage 5 so that the cooling water which flows from the cooling water passage 5 into the water jacket 4 can flow out toward the cylinder head through the water holes 16 after passing through the water jacket 4.

In the present embodiment, the gasket 11 is provided with a control board 21 within the water jacket 4 toward the intake port so as to project into the cylinder block 1, the control board 21 being formed to be arcuate in conformity to the profile of the water jacket 4, as shown in dotted lines in FIG. 2.

Although the control board 21 is not disposed at a location where the water holes 17 are formed in the embodiment as shown, but the control board 21 may also be disposed along the water holes.

Figure 3:
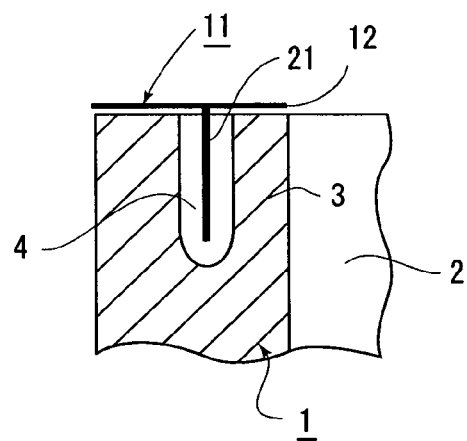
FIG. 3 is a cross section taken along the line III—III shown in FIG. 2.

FIG. 3 is a cross section taken along III—III shown in FIG. 2, and the control board 21 is provided so as to project through a given extent into the water jacket 4, with the top end of the control board 21 being welded to the gasket 11.

By providing the control board 21, the flow rate of the cooling water which flows into the water jacket 4 from the cooling water passage 5 increases toward the exhaust port as compared with a flow rate toward the intake port.

As the flow rate of the cooling water increases, a cooling efficiency of the cylinder wall 3 by the cooling water toward the exhaust port is enhanced, reducing a temperature difference which exists between the intake port side and the exhaust port side of the cylinder wall 3, allowing the cylinder wall 3 disposed toward the exhaust port to be prevented from being deformed by thermal expansion.

When the arcuate control board 21 projects in conformity to the water jacket 4 disposed toward the intake port, the flow rate of the cooling water which flows through the water jacket 4 disposed toward the intake port is reduced by an amount corresponding to the volume of the control board 21 while increasing the flow rate of the cooling water which flows through the water jacket 4 disposed toward the exhaust port by a corresponding amount.

As the flow rate of the cooling water which flows through the water jacket 4 disposed toward the exhaust port increases, the cooling efficiency of the cooling water toward the exhaust port is enhanced, resulting in a cooling of the cylinder wall 3 disposed toward the exhaust port being more intensely cooled than the cylinder wall 3 disposed toward the intake port, whereby a temperature difference of the cylinder wall 3 between the intake port side and the exhaust port side is reduced to prevent the cylinder wall 3 disposed toward the exhaust port from being deformed by thermal expansion.

Figure 6:
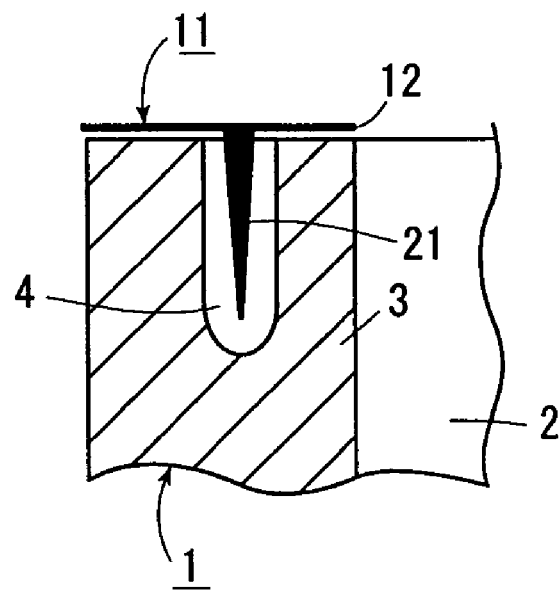
FIG. 6 is a cross section of B—B area shown in FIG. 4, illustrating a different manner from FIG. 5.

It is to be understood that the profile of the control board 21 shown in FIGS. 2 and 3 is merely an example, but that the extent of the water jacket over which the control board 21 is disposed and the degree of projection of the control board 21 into the water jacket 4 can be determined as desired. In addition, as illustrated in FIG. 6 which will be described later, the thickness of the control board 21 may be different between the side disposed toward the gasket 11 and the side disposed toward the bottom of the water jacket 4.

Figure 4:
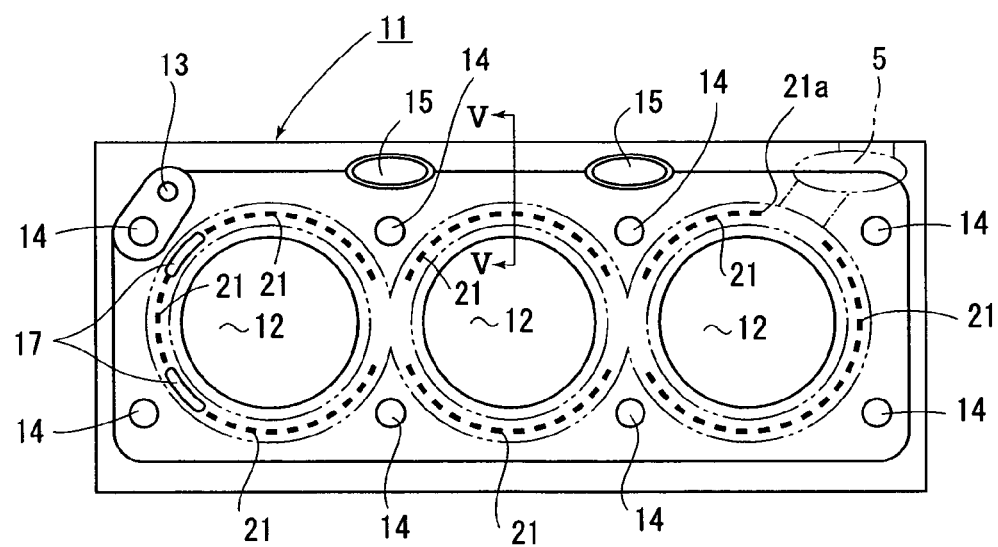
FIG. 4 is a plan view showing a gasket according to a second embodiment of the present invention.

FIG. 4 shows a gasket 11 according to a second embodiment of the present invention. In this embodiment, the gasket 11 is provided with control boards 21 projecting into the cylinder block 1 within the water jackets 4 disposed toward both the intake port and the exhaust port of an engine. As indicated in dotted lines in FIG. 4, the control board 21 is formed to be arcuate in conformity to the profile of the water jacket 4 in this embodiment also.

As for the cylinder bore 2 which is located to the left as viewed in this Figure, in the present embodiment, the end of the control board 21 disposed toward the intake port is formed up to the end of the water hole 17 formed toward the intake port while the end of the control board 21 disposed toward the exhaust port is formed up to the end of the water hole 17 formed toward the exhaust port, and a further control board 21 is formed between the two water holes.

On the other hand, as for the control boards 21 disposed around the right-hand cylinder bore 2 as viewed in this Figure, the end of the control board 21 disposed toward the intake port is extended to a point near the inlet of the cooling water passage 5 while the end of the control board 21 disposed toward the exhaust port is provided to a point near the inlet of the cooling water passage 5, thus forming an opening 21a between the control board 21 disposed toward the intake port and the control board 21 disposed toward the exhaust port in a region adjacent to the inlet of the cooling water passage 5.

Figure 5:
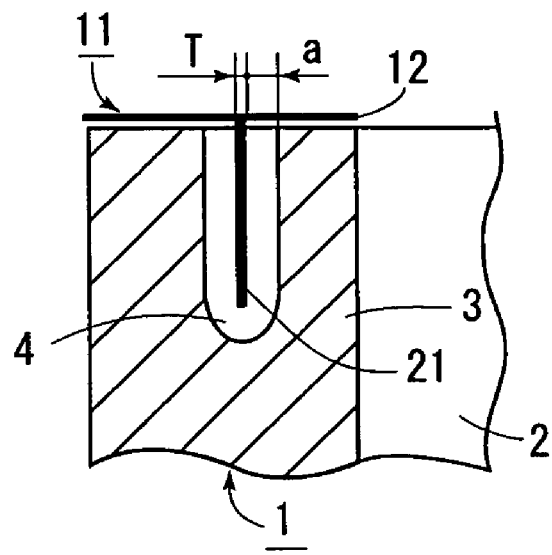
FIG. 5 is a cross section taken along the line V—V shown in FIG. 4.

FIG. 5 is a cross section taken along V—V shown in FIG. 4. In this Figure, T represents a sheet thickness of the control board 21 and a a spacing between the cylinder wall 3 and the surface of the control board 21, and this illustration is not limited to V—V region shown in FIG. 4, but also applies to each control board 21.

In the present embodiment, the sheet thickness T of the control board 21 is maintained constant, but the spacing a between the control board 21 and the cylinder wall 3 is different between the intake port side and the exhaust port side in order to prevent a deformation of the cylinder wall 3 by thermal expansion.

More specifically, when the spacing a used on the exhaust port side is chosen to be less than the spacing a on the intake port side, a boundary layer on the wall surface of the cylinder wall 3 for the cooling water which flows between the cylinder wall and the control board 21 disposed toward the exhaust port is thinner than a boundary layer formed on the wall surface of the cylinder wall 3 disposed toward the intake port.

When the boundary layer on the wall surface of the cylinder wall 3 becomes thin, a stagnation in the cooling water at a location adjacent to the cylinder wall 3 becomes reduced, allowing the cooling of the cylinder wall 3 to take place more efficiently in a corresponding manner.

Accordingly, this enhances the cooling efficiency of the cylinder wall 3 disposed toward the exhaust port, allowing a temperature difference between the intake port side and the exhaust port side of the cylinder wall 3 to be reduced to prevent a deformation of the cylinder wall 3 disposed toward the exhaust port by thermal expansion from occurring.

In FIG. 5, while maintaining the spacing between the center position of the control board 21 and the cylinder wall 3 constant, the sheet thickness T of the control board 21 may be varied, choosing a sheet thickness T of the control board 21 disposed toward the exhaust port which is greater than a sheet thickness T toward the intake port.

When so arranged, the spacing a between the control board 21 and the cylinder wall 3 toward the exhaust port is less than the spacing a toward the intake port, whereby a boundary layer on the wall surface of the cylinder wall 3 toward the exhaust port side becomes thinner than a boundary layer toward the intake port side.

Accordingly, in a similar manner as when the spacing between the control board 21 and the cylinder wall 3 is different between the exhaust port side and the intake port side, a temperature difference of the cylinder wall 3 between the intake port side and the exhaust port side can be reduced, allowing a deformation of the cylinder wall 3 disposed toward the exhaust port by thermal expansion to be prevented.

In FIG. 5, the control board 21 has a constant wall thickness T. However, as shown in FIG. 6, the sheet thickness of the control board 21 may be changed in a direction of the depth into the water jacket 4.

Specifically, when the sheet thickness T of the control board 21 toward the gasket 11 is chosen to be thick while the sheet thickness T toward the bottom of the water jacket 4 is chosen to be thin as shown in FIG. 6, the value of the spacing a toward the gasket 11 becomes less than the value of the spacing a toward the bottom of the water jacket 4.

When so arranged, a boundary layer of the cooling water toward the gasket 11 on the wall surface of the cylinder wall 3 becomes thinner than a boundary layer formed toward the bottom of the water jacket 4 to diminish a stagnation of the cooling water, enhancing the cooling effect upon the cylinder wall on the side toward the surface of the cylinder block 1 in a corresponding manner, more effectively cooling a portion thereof which is disposed close to the combustion chamber.

Figure 7:
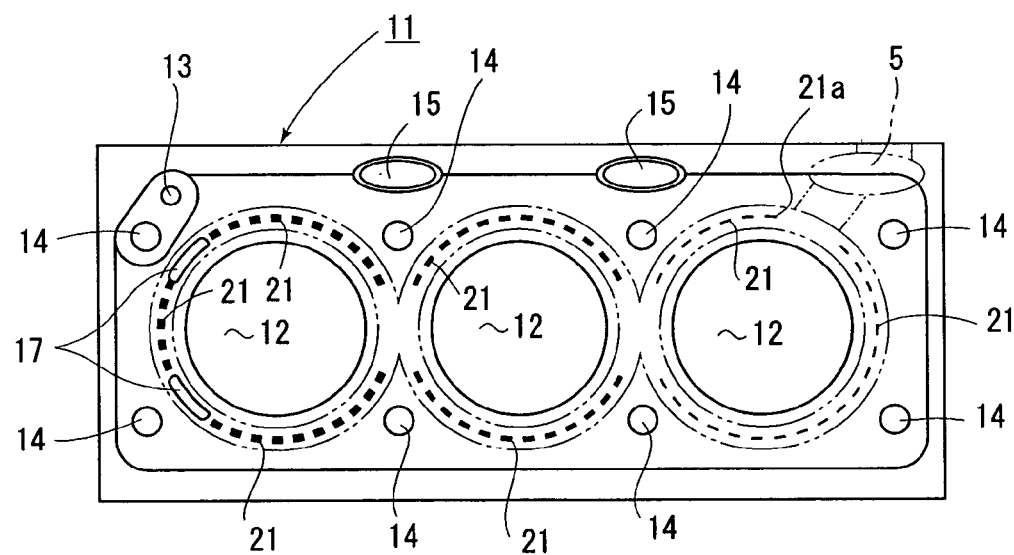
FIG. 7 is a plan view showing a gasket according to a third embodiment of the present invention.

FIG. 7 shows a gasket 11 according to a third embodiment of the present invention. Also in this embodiment, a control board 21 is disposed in a similar manner as in the second embodiment, and control boards 21 are disposed on both the intake port side and the exhaust port side.

In the present embodiment, a spacing between the control board 21 and the cylinder wall 3 for a cylinder bore 2 which is located adjacent to the inlet of the cooling water passage 5 is wider than a spacing between the control board 21 and the cylinder wall 3 for the cylinder bore 2 which is located away from the inlet.

Specifically, while maintaining a distance between the center of the sheet thickness of the control board 21 and the cylinder wall 3 constant for every cylinder bore 2, the sheet thickness of the control board 21 which surrounds the cylinder bore 2 located adjacent to the inlet of the cooling water passage 5 is chosen to be less than the sheet thickness of the control board 21 which surrounds the cylinder bore 2 located most remote from the cooling water passage 5.

Normally, the cooling water which has just flowed into the water jacket 4 from the cooling water passage 5 has not experienced any heating effect by the cylinder wall 3 or the like, and hence provides a sufficient cooling effect if the velocity of flow is more or less retarded.

On the other hand, the cooling water which has reached the cylinder wall 3 which is located most remote from the cooling water passage 5 has a raised water temperature as a result of its cooling other cylinder walls 3, and hence has a reduced cooling efficiency which is less than the cooling efficiency of the cooling water at a location adjacent to the inlet of the cooling water passage 5.

Accordingly, the cylinder wall 3 which is located most remote from the cooling water passage 5 will assume an elevated temperature as compared with other cylinder wall 3 as a result of such an insufficient cooling, and may be deformed by thermal expansion, leading to an oil depletion or a defective sealing by the gasket 11.

In addition, in a multicylinder engine as in the present embodiment, if only one of the cylinder bores 2 assumes an elevated temperature, the quantity of a fuel which is injected into the combustion chamber may be restricted or an advancing side of a piston may be limited, preventing an engine performance from being fully exercised.

To accommodate for such problems, in the present embodiment, the spacing a between the control board 21 and the cylinder wall 3 is changed from cylinder bore 2 to cylinder bore 2, and the spacing between the cylinder wall 3 and the control board 21 for the cylinder bore 2 which is located most remote from the cooling water passage 5 is chosen to be less than the spacing between the cylinder wall 3 and the control board 21 for the cylinder bore 20 which is located adjacent to the cooling water passage 5, thus intending that a boundary layer on the wall surface of the cylinder wall 3 for the cylinder bore 2 which is located most remote from the cooling water passage 5 be thinned.

Consequently, since the cylinder wall 3 which is located most remote from the cooling water passage 5 can be efficiently cooled, temperature differences between the cylinder walls 3 can be reduced, allowing a deformation of the cylinder wall 3 which is located most remote from the cooling water passage 5 by thermal expansion to be prevented.

In place of choosing different sheet thicknesses for the control boards 21 for different cylinder bores 2, a different spacing between the control boards 21 and the cylinder walls may be used while maintaining the sheet thickness of the control boards 21 constant as in the second embodiment to achieve a similar result as mentioned above. Alternatively, the control board 21 may have different sheet thicknesses toward the gasket and toward the bottom of the water jacket, as shown in FIG. 5.

Although the spacing between the control board 21 and the cylinder wall 3 is not different between the exhaust port side and the intake port side in the present embodiment, different spacings may be used as in the second embodiment, achieving a similar effect as achieved in the second embodiment in addition to the effect provided by the present embodiment.

Figure 8:
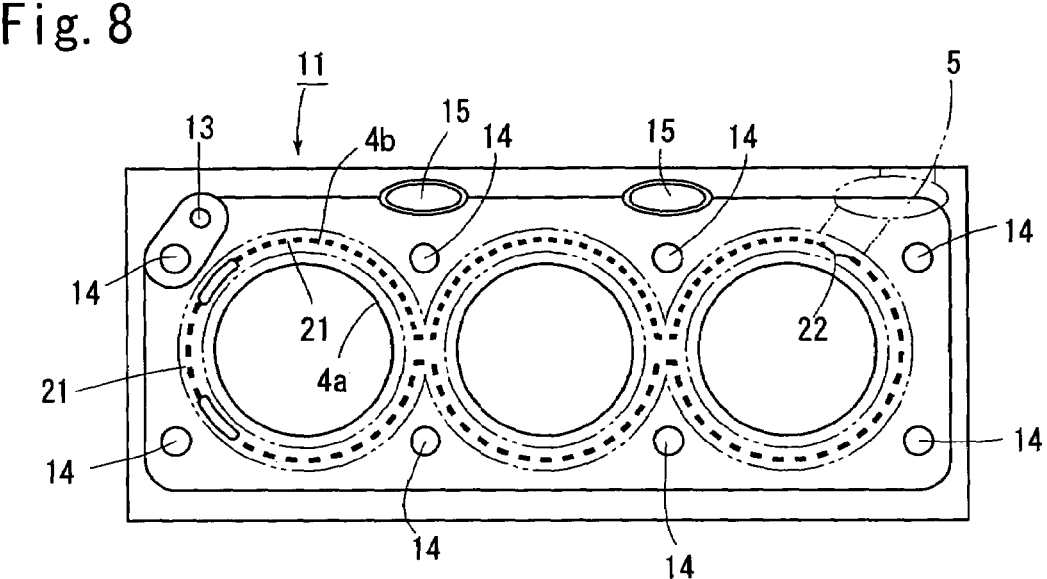
FIG. 8 is a plan view showing a gasket according to a fourth embodiment of the present invention.

FIG. 8 shows a gasket 11 according to a fourth embodiment of the present invention. In this embodiment also, a control board 21 is disposed on the intake port side and the exhaust port side of each cylinder bore 2, and in the present embodiment, control boards 21 disposed toward the exhaust ports for adjacent cylinder bores 2 are connected together, and the control boards 21 disposed toward the intake port sides are also connected together.

A thermo-valve 22 is disposed in an opening located adjacent to the inlet of the cooling water passage 5 and opens when the temperature of the cooling water reaches a given temperature. Except for locations which are superimposed with water holes 17 in the gasket 11, the water jacket is partitioned by the control boards 21 into an inner periphery chamber located toward the cylinder wall and an outer periphery chamber located outside.

In this instance, the control board 21 may reach the bottom surface of the water jacket 4 at this end, but it is not essential that this end of the control board reaches the bottom surface of the water jacket 4.

Figure 9:
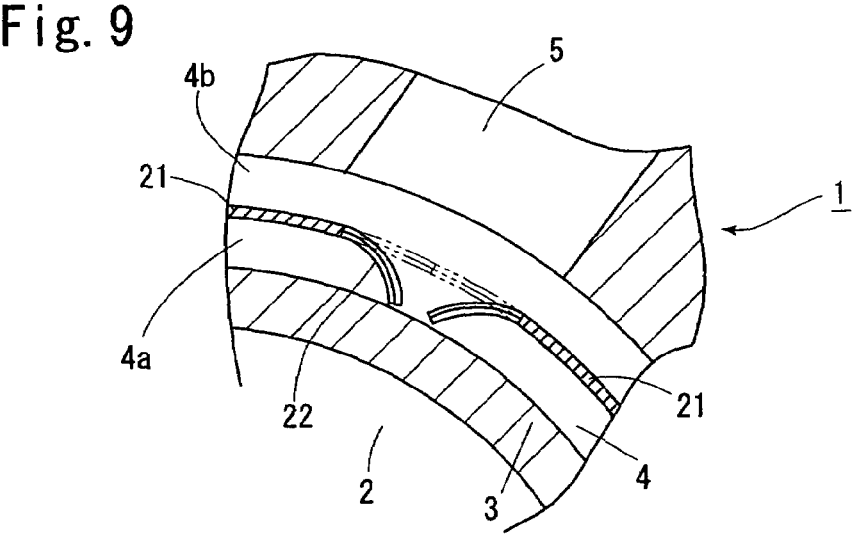
FIG. 9 is an enlarged view showing a thermo-valve shown in FIG. 8.

FIG. 9 is an enlarged view of the thermo-valve 22. Solid line indicates when the thermo-valve 22 is opened while double dot chain lines indicate a closed condition of the thermo-valve 20.

The thermo-valve is formed of two sheets of bimetal member. Each bimetal member has its one end secured to the end of the control board 21 which is disposed toward the intake port and the exhaust port, and the other end of the each bimetal member is disposed so as to abut against each other when the thermo-valve 22 is closed.

When the temperature of the cooling water around the thermo-valve 22 reaches a given temperature, the bimetal members become deformed toward the cylinder wall 3, whereby the thermo-valve 22 is opened. When the cooling water does not reach a given temperature, the thermo-valve 22 remains closed.

Normally, when an engine is started, or when the warming up of the engine is not performed, the cylinder bore 2 does not assume an elevated temperature, and there is no need to cool it by the cooling water. However, once the engine is started, the cooling water is pumped by a water pump into the water jacket to start cooling the cylinder wall.

Such cooling water prevents a temperature rise of the cylinder wall, and it takes an increased length of time until the engine becomes warmed up. Generally, a fuel cost during a warming up is worse in comparison to a fuel cost which is required after the warming up, and the longer it takes for the warming up, the worse the fuel cost.

However, with the present embodiment, the thermo-valve 2 remains closed when the engine is started and the temperature of the cylinder bore 2 rises until the cooling water around the cylinder wall 3 in the inner periphery chamber 4a reaches a given temperature. In this manner, there is little flow of the cooling water, and consequently, there is no effect of cooling the cylinder wall 3, allowing the cylinder wall 3 to be rapidly raised in temperature without being cooled by the cooling water to accelerate the warming up of the engine.

The thermo-valve 22 remains closed during the warming up, and hence if the cooling water flows from the cooling water passage 5 into the water jacket 4, it flows through the outer periphery chamber 4b without flowing into the inner periphery chamber 4a and then flows out to the cylinder head through the water holes 17.

When the temperature of the cylinder wall 3 rises and the cooling water therearound reaches a given temperature, the bimetal members are deformed to open the thermo-value 22, whereby the cooling water from the cooling water passage 5 flows into the inner periphery chamber 4a through the thermo-valve 22.

Once the thermo-valve 22 is open, the cooling water directly flows into the inner periphery chamber 4a through the thermo-valve 22 and continues to circulate through the inner periphery chamber 4a, allowing a cooling of the cylinder bore 2 to take place in a favorable manner.

It will be seen from the foregoing that with this embodiment, the time required for the warming up of the engine can be reduced and after the warming up of the engine, the cooling water is circulated through the inner periphery chamber 4a to perform a cooling of the cylinder bore 2 effectively.

Also in the present embodiment, it is possible to prevent a deformation of the cylinder wall by thermal expansion from occurring by providing different spacings between the cylinder wall 3 and the control board 27 to achieve different velocity gradients of the cooling water around the cylinder wall 3 between the intake port side and the exhaust port side or by achieving different velocity gradients of the cooling water around the cylinder wall 3 between the cylinder bore 2 located adjacent to the inlet of the cooling water passage 5 and the cylinder bore 2 which is located remote therefrom.

AVAILABILITY OF INDUSTRIAL USE

According to the first invention, the flow rate of the cooling water on the exhaust port side of the cylinder bore is increased, allowing a deformation of the cylinder wall disposed toward the exhaust port by thermal expansion to be prevented from occurring.

According to the second invention, a boundary layer on the wall surface of the cylinder wall disposed toward the exhaust port of the cylinder bore is thinned, allowing a deformation of the cylinder wall disposed toward the exhaust port by thermal expansion to be prevented from occurring.

According to the third invention, a boundary layer on the wall surface of the cylinder wall for the cylinder bore which is located remote from the cooling water passage is thinned, allowing a deformation of the cylinder wall which is located remote from the cooling water passage 5 by thermal expansion to be prevented from occurring.

According to the fourth invention, the water jacket is partitioned by the control board into a cylinder wall side and an outer periphery side, whereby the warming up of an engine is accelerated and an effective cooling of the cylinder bore is achieved after the warming up.

The invention claimed is:

1. A cooling unit for an engine comprising a cylinder head formed with an intake port on one side and with an exhaust port on the other side, a water jacket formed in a cylinder block in surrounding relationship with a cylinder wall which defines cylinder bores and opening into the surface of the cylinder block, a gasket held sandwiched between the cylinder head and the cylinder block to seal therebetween, and a control board on the gasket and inserted into the water jacket;

characterized in that the control board is formed to be arcuate in conformity to the profile of the water jacket and is disposed only toward the intake port.

2. A cooling unit for an engine comprising a cylinder head formed with an intake port on one side and with an exhaust port on the other side, a water jacket formed in a cylinder block in surrounding relationship with a cylinder wall which defines cylinder bores and opening into the surface of the cylinder block, a gasket held sandwiched between the cylinder head and the cylinder block to seal therebetween, and a control board on the gasket and inserted into the water jacket;

characterized in that the control board is formed to be arcuate in conformity to the profile of the water jacket, the control board being disposed toward each of the intake port and the exhaust port, a spacing between the control board which is disposed toward the exhaust port and the cylinder wall being set to be narrower than the spacing between the control board disposed toward the intake port and the cylinder wall.

3. A cooling unit for an engine comprising a cylinder head formed with an intake port on one side and with an exhaust port on the other side, a water jacket formed in a cylinder block in surrounding relationship with a cylinder wall which defines cylinder bores and opening into the surface of the cylinder block, a gasket held sandwiched between the cylinder head and the cylinder block to seal therebetween, and a control board on the gasket and inserted into the water jacket;

characterized in that there are a plurality of cylinder bores and the control board is formed to be arcuate in conformity to the profile of the water jacket, the control board being disposed toward the intake port and toward the exhaust port for each cylinder bore, a spacing between the cylinder wall and the control board for the cylinder bore which is located adjacent to the inlet of a cooling water passage which feeds a cooling water to the jacket being set to be wider than a spacing between the cylinder wall and the control board for the cylinder bore which is located remote from the inlet.

4. A cooling unit for an engine comprising a cylinder head formed with an intake port on one side and with an exhaust port on the other side, a water jacket formed in a cylinder block in surrounding relationship with a cylinder wall which defines cylinder bores and opening into the surface of the cylinder block, a gasket held sandwiched between the cylinder head and the cylinder block to seal therebetween, and a control board on the gasket and inserted into the water jacket;

characterized in that there are a plurality of cylinder bores and the control board is formed to be arcuate in conformity to the profile of the water jacket, the control board being disposed toward each of the intake port and the exhaust port for each cylinder bore, control boards disposed toward the intake port for each cylinder bore being connected together and the control boards disposed toward the exhaust port for each cylinder bore being connected together, further comprising a thermo-valve disposed between the control board disposed toward the intake port and the control board disposed toward the exhaust port at a location adjacent to the inlet of a cooling water passage which feeds a cooling water to the water jacket and opening when the temperature of the cooling water rises to a given temperature.

5. A cooling unit for an engine according to claim 4 in which the thermo-valve comprises a pair of bimetal members, the bimetal members having their one end adjacent to each other, the other end of each of the bimetal members being secured to the end of the control board which is disposed toward the intake port or the exhaust port, the bimetal members being deformed when the temperature of the cooling water rises to a given temperature to produce a gap between the pair of bimetal members to open.

6. A cooling unit for an engine according to claim 2 characterized in that the control boards have different sheet thicknesses to produce different spacings.

7. A cooling unit for an engine according to claim 1 characterized in that the control board has a sheet thickness which is different between a portion thereof which is disposed toward the gasket and another portion disposed toward the bottom surface of the water jacket.

* * * * *